US006023690A

United States Patent [19]

Chrosny et al.

[11] Patent Number: 6,023,690

[45] Date of Patent: Feb. 8, 2000

[54] METHOD AND APPARATUS FOR SECURELY RESETTING A REAL TIME CLOCK IN A POSTAGE METER

[75] Inventors: Wojciech M. Chrosny, Orange; Dale A. French, Clinton, both of Conn.

[73] Assignee: Pitney Bowes Inc., Stamford, Conn.

[21] Appl. No.: 08/874,125

[22] Filed: Jun. 12, 1997

[51] Int. Cl.[7] .......... G06F 12/16

[52] U.S. Cl. .......... 705/405

[58] Field of Search .......... 705/405, 401, 705/402, 403, 404, 406, 407, 408, 409, 410

[56] References Cited

U.S. PATENT DOCUMENTS

| | | | |
|---|---|---|---|
| 4,301,507 | 11/1981 | Soderberg et al. | 705/410 |
| 4,775,246 | 10/1988 | Edelmann et al. | 380/23 |
| 4,812,994 | 3/1989 | Taylor et al. | 705/410 |
| 4,858,138 | 8/1989 | Talmadge | 705/408 |
| 4,864,618 | 9/1989 | Wright et al. | 380/51 |
| 4,907,271 | 3/1990 | Gilham | 380/25 |
| 5,051,564 | 9/1991 | Schmidt | 235/381 |
| 5,243,654 | 9/1993 | Hunter | 380/51 |
| 5,301,116 | 4/1994 | Grunig | 705/410 |
| 5,309,363 | 5/1994 | Graves et al. | 705/403 |
| 5,319,562 | 6/1994 | Whitehouse | 705/403 |
| 5,377,268 | 12/1994 | Hunter | 380/23 |
| 5,457,642 | 10/1995 | Brookner | 705/408 |
| 5,483,458 | 1/1996 | Lee et al. | 705/410 |
| 5,731,980 | 3/1998 | Dolan et al. | 705/410 |
| 5,787,406 | 7/1998 | Arsenault et al. | 705/410 |

FOREIGN PATENT DOCUMENTS

| | | | |
|---|---|---|---|
| 0 725 371 | 7/1996 | European Pat. Off. | G07B 17/02 |

*Primary Examiner*—Emanuel Todd Voeltz
*Assistant Examiner*—Thomas A. Dixon
*Attorney, Agent, or Firm*—Steven J. Shapiro; Michael E. Melton

[57] ABSTRACT

A value dispensing system includes: a printing mechanism for printing an indication of value; a microprocessor including a real time clock mechanism, the microprocessor initiating printing of the indication of value by the printing mechanism; a device for electrically connecting the value dispensing system to a primary power source and for utilizing power received from the primary power source to operate the microprocessor and the printing mechanism; a back-up power source which supplies backup power to the microprocessor to enable continued operation of the real time clock only when the value dispensing system has been disconnected from the primary power source; wherein the microprocessor is programmed to 1) disable operation of the printing mechanism upon a failure of the backup power source and in response to reconnection of the primary power source to the value dispensing system, 2) require resetting of the real time clock as a prerequisite for reenabling the operation of the printing mechanism subsequent to its disablement by the microprocessor, and 3) only permitting the resetting of the real time clock subsequent to inserting a real time clock security card into the value dispensing system.

6 Claims, 3 Drawing Sheets

METHOD AND APPARATUS FOR SECURELY RESETTING A REAL TIME CLOCK IN A POSTAGE METER

FIELD OF THE INVENTION

The present invention relates to systems which utilize resettable internal real time clocks, and more particularly, to a security system for enhancing the security associated with the resetting of a internal real time clock of a value dispensing system such as a postage metering system.

BACKGROUND OF THE INVENTION

Value dispensing systems such as postage meters, tax meters, insurance certificate meters, lottery machines, and ticket dispensing devices, are well known in the art. Each of the aforementioned value dispensing systems typically print an indication of value together with the time and date that the indication of value was printed. The printed time and date provides an indication as to the validity of the value dispensed. For example, if an insurance certificate is printed with a certain time and date, it prevents the certificate holder from filing an insurance claim for activities prior to the printed date. Moreover, in postage meters, it is known to print a postal indicia together with the time and date it was printed as well as with additional encrypted information. The encrypted information often utilizes the time and date information as data for the encryption algorithms which produce the encrypted information. The encrypted information can then be decrypted by an appropriate validating authority to determine if the printed postal indicia is a valid postal indicia.

In addition to the validation aspects discussed above, the use of an internal real time clock in a value dispensing mechanism is also often required to initiate and complete certain key maintenance activities in the value dispensing mechanism based on the actual time and date (i.e. day, month, year). For example, in a postage meter which uses an ink jet printer, the initiation and ending of maintenance functions associated with the purging, vacuuming and wiping of the printhead are often tied to a particular time of day or associated with a predetermined period of time that has elapsed since the last maintenance action. In the event that a secure real time clock is not utilized, improper maintenance of the printhead could occur resulting in a shortened printhead operational life.

Furthermore, in postage metering systems, it is often desirable to ensure that the postage meter user operatively connects the postage meter to a remote data center on a periodic basis of, for example, three months, so that the postal authority or the meter manufacturer can remotely inspect the meter. That is, by requiring a periodic remote inspection, the data center can query the individual meter to get certain information about its usage such as the data in appropriate accounting registers. This inspection data can then be analyzed by the postal authority to determine if any potential tampering of the meter has occurred.

In summary, the security of the internal clock of a value dispensing mechanism may be very important for a variety of reasons including indicia validation, detecting potential security breaches, and for ensuring timely maintenance. Thus, if the internal real time clock of the value dispensing mechanism can be changed by any user thereof with no use restrictions, either a potential misuse of the value dispensing mechanism can be achieved by the fraudulently changing the clock date and time (such as to get the benefit of a lower postal rate in the event there is a rate change occurring on a certain day) or, alternatively, failure of certain components of the value dispensing mechanism may occur if preprogrammed maintenance operations which are initiated and ended based on the internal real time clock are not accomplished or not timely accomplished because of an inappropriate resetting of the real time clock by the user.

One approach to solving the above mentioned problems would simply be to prevent the user from having any capability whatsoever of resetting the internal real time clock subsequent to its initial setting at the manufacturing facility of value dispensing mechanism. However, this would require the use of a physically secure clock chip which includes its own internal battery-backed power source which is guaranteed to last for example, ten years, or beyond the anticipated life of the value dispensing mechanism. However, in the case of a postage meter some adjustment of the real time clock mechanism may still be required to permit the changing of the clock to accommodate such things as daylight savings time, or the time zone changes associated with the movement of the meter from one time zone within a country or possibly even to another country in a different time zone. If the value dispensing mechanism is set up such that the user cannot adjust the clock mechanism when any of the above situations occur, it would require sending the meter back to the manufacturer for such changes. This obviously would be inconvenient for the user. Thus, a compromise must be struck between the security required for the internal real time clock relative to preventing unauthorized changing of its settings and the need for the user to be able to set the real time clock as required. Furthermore, in the field of postage meters, the United States Postal Service has recently issued new indicia based program specifications which will require that each meter have a secure clock mechanism incorporated therein. Therefore, those meters currently in the field which do not have a secure clock may need to be retrofitted to provide some form of clock security which is satisfactory to the United States Postal Service. However, the retrofit solution for such postage meter systems needs to be one that can be implemented quickly, easily, and at a low cost.

Another problem associated with postage metering systems that use a battery backup to keep the real time clock running when the primary source of power has been disconnected is that if the battery backup fails, the real time clock will have the wrong time. Accordingly, it is desirable to ensure that in the event the battery backup fails, the real time clock must be reset in a secure manner prior to permitting operation of the postage metering system.

SUMMARY OF THE INVENTION

It is an object of the invention to provide a value dispensing mechanism, such as a postage meter, which automatically disables operation of the postage meter and requires the resetting of its real time clock when a battery backup used to operate the real time clock in the absence of a primary power source fails. This object is met by a value dispensing system including: a printing mechanism for printing an indication of value; a microprocessor including a real time clock mechanism, the microprocessor initiating printing of the indication of value by the printing mechanism; means for electrically connecting the value dispensing system to a primary power source and for utilizing power received from the primary power source to operate the microprocessor and the printing mechanism; a back-up power source which supplies backup power to the microprocessor to enable continued operation of the real time clock only when the value dispensing system has been disconnected from the primary power source; wherein the microprocessor is programmed to 1) disable operation of the printing mechanism upon a failure of the backup power source and in response to reconnection of the primary power source to the value dispensing system, 2) require resetting of the real time clock as a prerequisite for reenabling the operation of the printing mechanism subsequent to its disablement by the microprocessor, and 3) only permitting the resetting of the real time clock subsequent to inserting a real time clock security card into the value dispensing mechanism.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENTS

Figure 1:
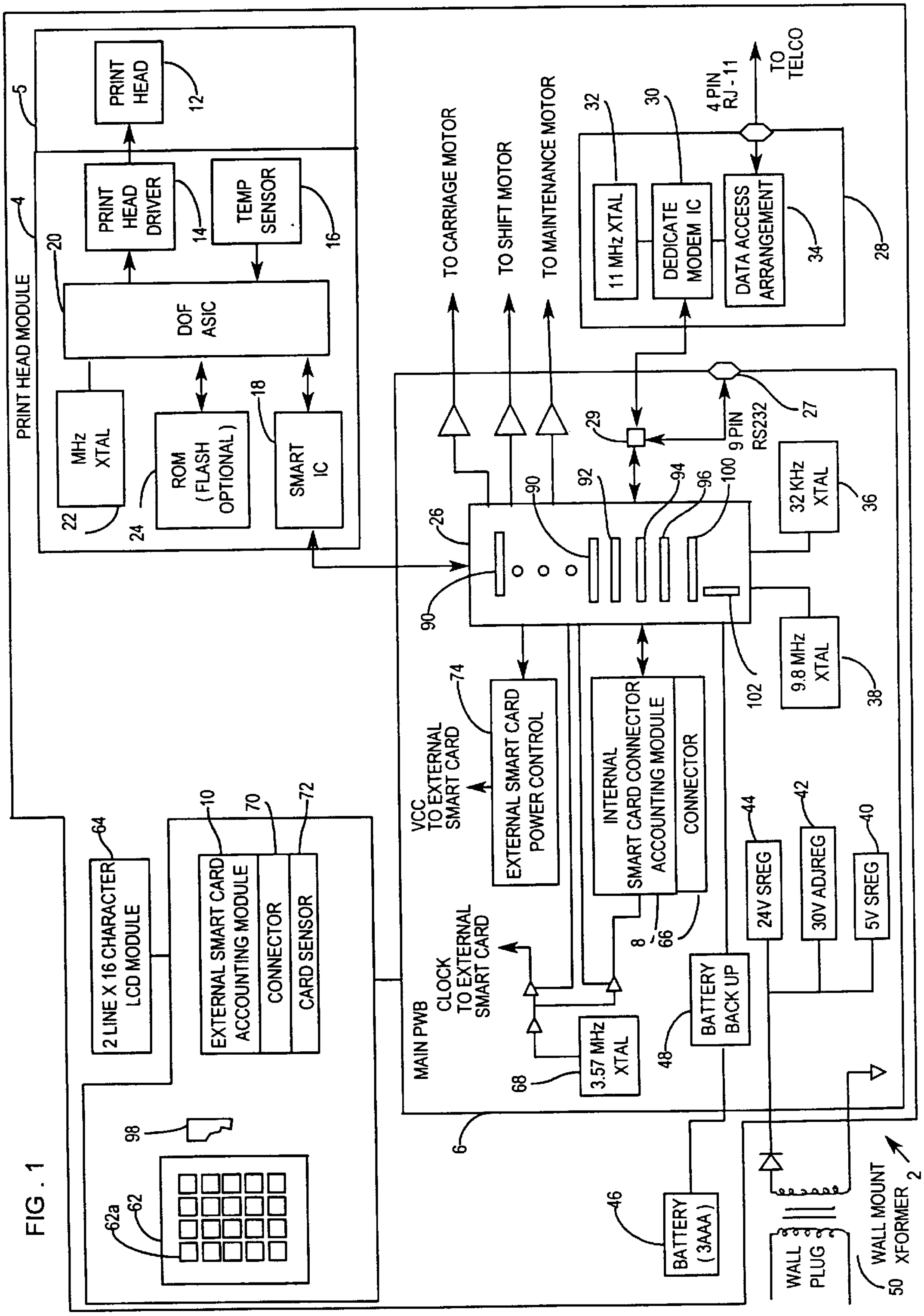
FIG. 1 is a schematic drawing of the electrical architecture of a postage metering system incorporating the claimed invention.

FIG. 1 shows an electronic postage meter system 2 which includes a removable printhead module 4 within a housing 5, a base module 6 including a secure internal smart card accounting module 8 and a secure external smart card accounting module 10. The postage meter 2 accounts for each individual postage transaction via the internal accounting module 8 or via the external smart card accounting module 10 if the external smart card accounting module 10 is connected to the base module 6 via a conventional connector 70. That is, upon insertion of the external smart card accounting module 10 into the connector 70, a card sensor (such as a mechanical switch) 72 is tripped in a conventional manner sending a signal to the base module 6 indicating that accounting should be accomplished via the external smart card accounting module 10 versus the internal smart card accounting module 8.

The print module 4 includes a printhead 12, such as an ink jet printhead. A printhead driver 14 provides the necessary signals and voltages to the printhead 12 to energize the printhead 12 to emit drops of ink on the mailpiece to form the postal indicia image. A temperature sensor 16 is used to sense ambient temperature. Since the ambient temperature changes the viscosity of the printhead ink, the temperature information enables changing of the signals and voltages of the printhead to maintain a constant drop size.

The print module 4 also includes a smart card chip 18 which receives encrypted command and control signals from base module 6 and provides information to an application specific integrated circuit (ASIC) 20 to operate the printhead driver 14. The ASIC, may be of the type described in U.S. patent application Ser. No. 08/554,179 filed Nov. 6, 1995 entitled MAIL HANDLING APPARATUS AND PROCESS FOR PRINTING AN IMAGE COLUMN-BY-COLUMN IN REAL TIME and assigned to Pitney Bowes Inc., the disclosure of which is hereby incorporated by reference. The ASIC, which is connected to a crystal clock 22, obtains the necessary printing operating program information from a ROM or flash memory 24 to appropriately control the sequence of the printing data being provided to the printhead driver 14 such that the printhead 12 produces a valid and properly imprinted postal indicia.

Base module 6 includes a microcontroller 26 which is electronically connected to various motors associated with the movement and maintenance of printhead 12, and is furthermore electronically connected to a display 64 as well as to both the internal smart card accounting module 8, the external smart card accounting module 10, and the smart card chip 18. The microcontroller 26 thus serves as the communication center through which all communications between the accounting modules 8,10 and the print module 4 take place. The microcontroller 26 is also connected to a modem 28 which includes a modem chip 30 connected to a crystal clock 32 and a data access arrangement 34 for enabling modem communications between the metering system 2 and external systems.

An RS232 port 27 is provided. The RS232 port 27 is connected to the microcontroller 26 via a switch 29 which is operated under the control of the microcontroller 26 such that either the RS232 port 27 is enabled or the modem 28 is enabled.

The microcontroller 26 is operated under the control of two separate crystal clocks 36 and 38. The higher frequency 9.8 megahertz crystal clock 38 is used when the electronic meter system 2 is in active operation and the lower speed 32 kilohertz crystal clock 36 is used when the meter is in a “sleep mode” whereby the display 64 is blanked and the system is in a quiescent state.

Various power is provided to the electronic postage meter system 2 including a 5 volt regulated power supply 40, a 30 volt adjustable power supply 42, and a 24 volt regulated power supply 44. Additionally, a battery 46 is connected via a battery back-up circuit 48 to the microcontroller 26 to provide operating power to the microcontroller 26 when the external source of AC operating power 50 is disconnected.

Microcontroller 26 is also connected to a keypad 62 which enables a user to enter data into the electronic metering system 2. The information entered by the user via keypad 62 or conveyed to the user by the electronic postage metering system 2 is displayed via a display 64.

As previously mentioned, the electronic postage metering system 2 employs the use of two separate smart card accounting modules 8 and 10. The internal smart card accounting module 8 is connected to the microcontroller 26 via a plug connector 66. A 3.57 megahertz crystal clock 68 is connected to both the internal smart card 8 accounting module and the external smart card accounting module 10 with the connection to the external smart card accounting module being through the connector 70. Thus, when the external smart card accounting module 10 is inserted into the connector 70, the card sensor 72 detects the presence of the external smart card accounting module 10 such that a signal is sent from the card sensor 72 to the microcontroller 26. Upon receipt of this signal, microprocessor 26 enables the external smart card power control circuitry 74 to apply power to the external smart card accounting module 10 and engages the crystal clock 68 to provide clock signals to the external smart card accounting module 10 all via the smart card connector 70.

Microcontroller 26 includes a plurality of registers (counters) 90 which are used to identify the current day, time, month and year. Each of these registers are incremented periodically via program means stored in a nonvolatile memory 92 to ensure that the actual real time is known by microcontroller 26. Program That is, the program means stored in nonvolatile memory 92 causes the microcontroller 26 to interrupt whatever function it is performing on a periodic basis to update the appropriate day, time, month and year registers 90 based on the number of pulses generated by either crystal clock 36 or 38. Therefore, depending on which of crystal clocks 36, 38 is currently being utilized by microcontroller 26, the programming in memory 92 associates, for example, a specific number of pulses for the specified clock 36, 38 with a particular unit of time elapsed (i.e., second, minute, day, month, year, etc.) and when the requisite number of pulses associated with the particular unit of time has been generated by the crystal clock 36, 38, the corresponding register 90 is automatically incremented by one. Moreover, while the discussion above sets forth that a predetermined number of clock pulses can be associated with each register increment, it is also readily apparent to one possessing ordinary skill in the art that the smallest time unit can be incremented by a count of one based on the number of pulses of the crystal clock while the other time registers can then be incremented based on a predetermined number stored in the smallest unit time register (i.e., seconds) or upon each other (i.e. hour register at 24 then day register is incremented by one). Thus, with the software architecture stored in memory 92, the microprocessor 26 makes use of the crystal clocks 36, 38 to ensure that an accurate real time is always maintained by the microprocessor 26.

The time registers 90 can be read by the microcontroller 26 at any point in time to 1) display the real time on the display 64, 2) provide an input via the smart card chip 18 to the ASIC 20 so that the appropriate time and date can be printed in a postal indicia for each transaction, 3) provide the time and date to the accounting modules 8, 10 to be included as part of the encrypted information generated by those modules, 4) permit the microprocessor 26 to timely implement various meter functions such as printhead maintenance, and 5) require connection of the electronic postage meter system to a remote database to permit a remote inspection to occur. Thus, the real time clock mechanism (92, 90, 36, 38) set forth above is very critical to the operation of the electronic postage meter.

Microprocessor 26 also includes memory 94 having programming therein which permits the user to set the real time (for example, time, day, month, year) via the keyboard 62. The user can hit a designated key 62*a* which identifies to the microprocessor 26 that the user wishes to enter the set up routine for resetting one of a plurality of meter parameters including resetting of the real time clock mechanism. The programming in memory 94 will then query the user, via display 64, as to which parameter the user desires to change. The user responds, via keyboard 62, and if a resetting of the clock mechanism is selected, the programming in memory 94 queries the user as to what the new time, day, month and year should be. The user then enters the new day, time, month and year via the keyboard 62. This information is then accepted by microprocessor 26 which in turn updates the registers 90 accordingly. The real time is then maintained starting from the entered time and date in accordance with the program means 92 discussed above.

The real time clock structure (90, 92, 94, 36, 38) set forth above permits the user to change the real time. Moreover, the battery 46 and battery back-up circuitry 48 provide power to the microcontroller 26 when the AC power has been removed so that the real time clock mechanism (90, 92, 36, 38) continues to keep accurate time even though the electronic postage meter system 2 is not in its operational mode. However, as previously discussed, this type of clock system (non-secure) also permits any user of the postage meter to change the real time with no restrictions whatsoever. The unrestricted access to the real time clock set up feature can lead to potential fraudulent activity on behalf of the user or, alternately, can result in required maintenance activities and inspection routines, which are based on the real time, being completely avoided.

One alternative to solving the above discussed problems associated with a non-secure clock is to provide a secure clock module in the base module 6 as described in United States Patent Application entitled "ELECTRONIC POSTAGE METER SYSTEM HAVING PLURAL CLOCK SYSTEM PROVIDING ENHANCED SECURITY" Ser. No. 08/846,646 which was filed on Apr. 30, 1997 and which is assigned to the assignee of the present invention and which is incorporated herein by reference. The solution presented in the aforementioned application, however, requires the added secure clock module to interface with the microprocessor 26 in order to update the registers 90 based on the newly added secure clock module. The secure clock module has its own operating clock which is sealed and inaccessible to a user and includes its own battery back-up which would, for example, have a guaranteed life of ten years in order to exceed the operating life of the postage metering system 2. Thus, at least theoretically, the newly added secure clock module would never require a timing reset based on a failure of the back-up battery. While this system would provide the required clock security, assuming that the capability of the user to reset the clock is eliminated, it is also a very expensive solution especially for retrofitting existing meters which operate using the clock system (90, 92, 94, 36, 38). That is, the new secure clock module must be added to existing postage metering systems which represents a hardware cost, and the microcontroller 26 must be reprogrammed to utilize the input from the newly added secure clock module for the purpose of ensuring that the registers 90 reflect the real time of the added secure clock module and are not based upon the clocks 36, 38. Moreover, in order to provide the user with some real time clock reset capability to, for example, account for time changes because the meter is transported between various time zones, the aforementioned copending application provides a further complex synchronizing mechanism to control the extent to which the user can adjust the real time. Once again, this solution is effective but costly particularly with respect to retrofitting existing postage meter systems which do not have a secure clock module.

In lieu of adding a secure clock module to the postage metering system as thus far described, the Applicants of the instant invention have invented an alternate solution which 1) only requires a software change to be made to the electronic postage metering system as thus far described, 2) is easy to implement in the field, and 3) provides for the desired enhanced clock security. That is, the microcontroller 26 includes programming installed in memory 96 which only permits the clock set-up routine of memory 94 to be executed subsequent to a secure clock smart card 98 being inserted into the connector 70 as will be discussed in more detail below with reference to FIG. 2.

Figure 2:
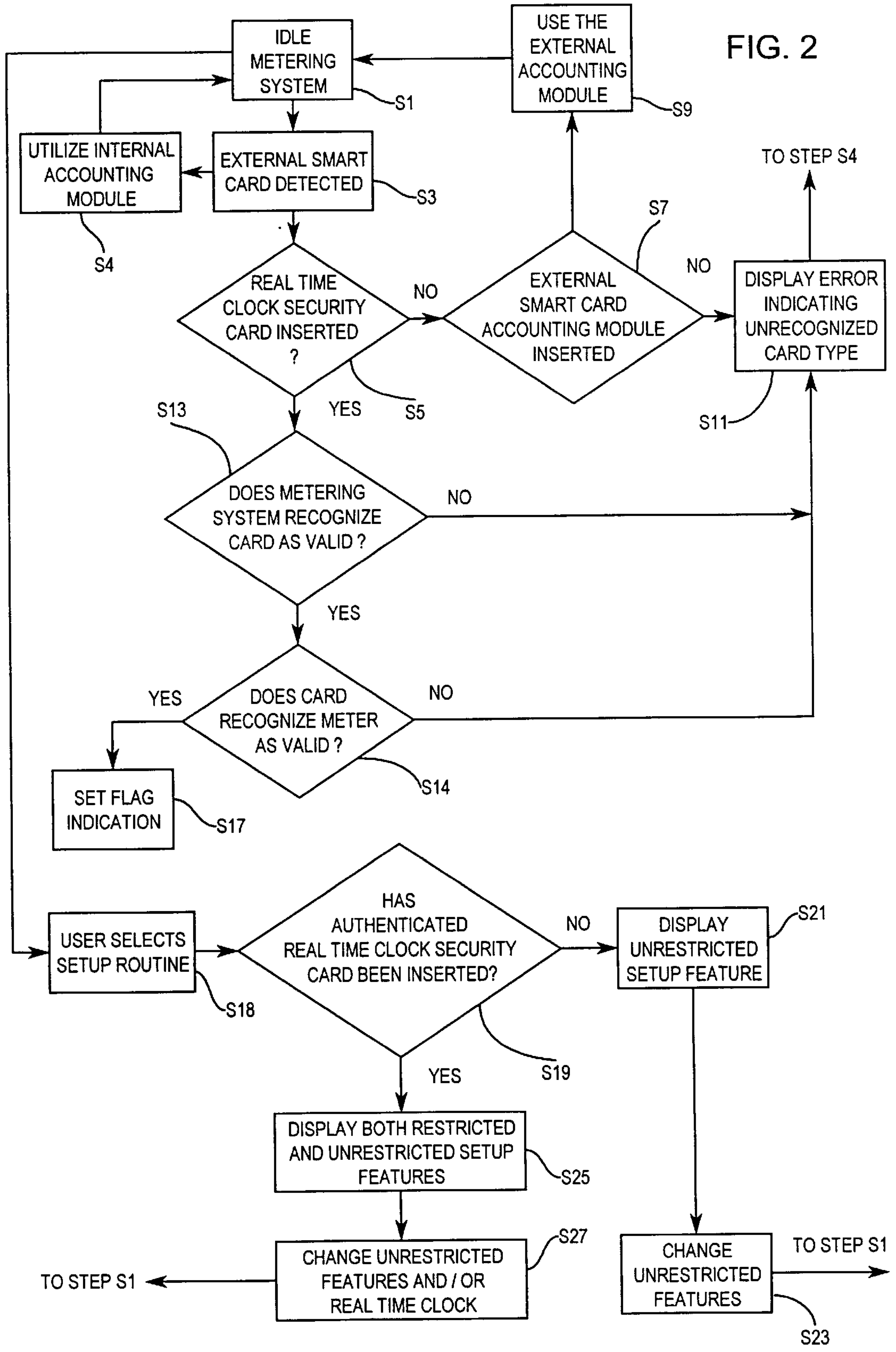
FIG. 2 is a flow chart of the inventive secure real time clock program routine.

In FIG. 2, at step S1 the electronic postage meter system 2 is powered up in its operational mode and is in an idle state awaiting a postage transaction request to be entered by the user via the keyboard 62. At step S3, microprocessor 26 determines if a smart card has been inserted into the connector 70 based on whether or not microprocessor 26 receives a signal from card sensor 72. In the event that an external smart card is not currently inserted into connector 70, microprocessor 26 does not receive a signal from sensor 72 such that the inquiry at step S3 is "NO". In step S4, microprocessor 26 is then programmed to utilize the internal smart card accounting module 8 to account for any postage transaction requested by the user and the programming returns to the idle state of step S1 to await the user request. Alternatively, if microprocessor 26 receives a signal from card sensor 72, the answer to inquiry at step S3 is "YES" and the program proceeds to step S5 where an inquiry is made by microprocessor 26 as to whether the inserted smart card is a real time clock security card 98. That is, both the real time clock security card 98 and the external smart card accounting module 10 each contain a numeral identifier stored in a respective memory thereof, which numeral identifier is peculiar to the specific type of smart card. Thus, at step S5 the microprocessor 26 queries the inserted external smart card for its numeral identifier. Upon receipt of the numeral identifier from the external smart card, the microprocessor 26 determines if a real time clock security card 98 has been inserted into connector 70. If the numeral identifier does not match that of a real time clock security card 98 or if after a predetermined period of time (for example, one second) from the query for the numeral identifier made by microprocessor 26 no response is received from the inserted external smart card, the answer to the query at step S5 is "NO". The program then proceeds to step S7 where a determination is made by microprocessor 26 as to whether the inserted external smart card is an external smart card accounting module 10. If a numeral identifier has been received by microprocessor 26 which identifiers the inserted external smart card as an external smart card accounting module 10, the answer to the query at step S7 is 'YES' and the program proceeds to step S9 where microprocessor 26 is programmed to utilize the external smart card accounting module 10 in lieu of the internal smart card accounting module 8 for all postage transactions. Returning to step S7, if it is determined that the inserted external smart card is not an external smart card accounting module 10, an error message will be displayed on the display 64 indicating that an unrecognized card has been inserted into the connector 70 (step 11) At this point, the program can proceed to step S4 where the microprocessor designates the internal accounting module 8 to be used for each postage transaction. However, alternatively, after step S1, the printing and accounting functions of the electronic postage metering system could be disabled until the unrecognized card were removed. This would prevent the inadvertent use of the internal accounting module 8 for postage transactions intended to be deducted from the external accounting module 10 by a user who attempts to initiate a postage transaction despite the displayed error message.

Returning to step S5, if a real time clock security card 98 is detected, the program proceeds to initiate a mutual authentication procedure between the inserted smart card and the print module IC chip 18 following a known mutual authentication procedure as set forth in U.S. patent application Ser. No. 08/576,665 filed on Dec. 21, 1995 and which is hereby incorporated by reference. Alternatively, other mutual authentication procedures such as the one set forth in U.S. Pat. No. 4,864,618 can also be utilized. What is common to each of these known techniques is that first the print module IC verifies (step S13) that the real time clock security card 98 is a valid card (not fraudulent copy) and then the real time clock security card 98 validates that the print module IC is valid. It is only after the inquiry at steps S13 and S15 are both affirmatively answered that a flag is set in microprocessor 26 (step S17) to indicate that a valid real time clock security card 98 has been inserted into connector 70. Upon removal of the real time clock security card 98, the flag is reset to indicate that a real time clock security card 98 is not presently inserted in connector 70. Moreover, assuming that the answer to the inquiry at either of steps S13 and S15 is "NO", an error message is displayed at step S11 as previously discussed.

Returning to step S1, if the electronic postage meter system 2 is in the idle state and a user at step S18 presses key **62*a* to enter the parameter set up routine, the microprocessor 26, at step S19, determines if a real time clock security card 98 has been inserted into the connector 70. That is, if a flag has been set at step S17, a real time clock security card 98 has been inserted whereas the absence of the set flag indicates the opposite result. In the event no real time clock security card 98 has been inserted, at step S21, the display 64 will show the user all of the unrestricted parameters (such as changing a password or setting up a new account number, etc.) of the electronic postage metering system 2 which the user is free to change. The user can select the one(s) of the parameters they wish to change and at step S23 make the desired changes via the keyboard 62 and a set of menu driven instructions displayed on display 64. Once all of the desired changes have been made, the programming returns to step S1 to await the next user input. Alternatively, if at step S19 a real time clock security card 98 is identified as having been inserted into connector 70, the display 64 will display both the unrestricted parameters which can be changed as well as the restricted clock set up parameter (step S25). The user is then free to change any of the unrestricted parameters as well as to reset the real time clock (step S27). Once the real time clock and or the unrestricted parameters have been changed, the program returns to step S1** to await further instructions from the user.

In view of the above description of FIG. 2, it is very clear that access to the real time clock parameter reset routine is restricted to only those users possessing a valid authenticated real time clock security card 98. If an organization closely controls access to the real time clock security card 98 to only a limited number of authorized personnel, the potential intentional or inadvertent resetting of the real time clock is effectively eliminated via an easily implemented secure clock system in the postage meter. Moreover, because of the two security requirements built into the real time clock security card concerning the secure card numeral identifier and the mutual authentication requirement, the ability for unauthorized cards to be produced which would facilitate unauthorized resetting of the real time clock is essentially precluded.

Figure 3:
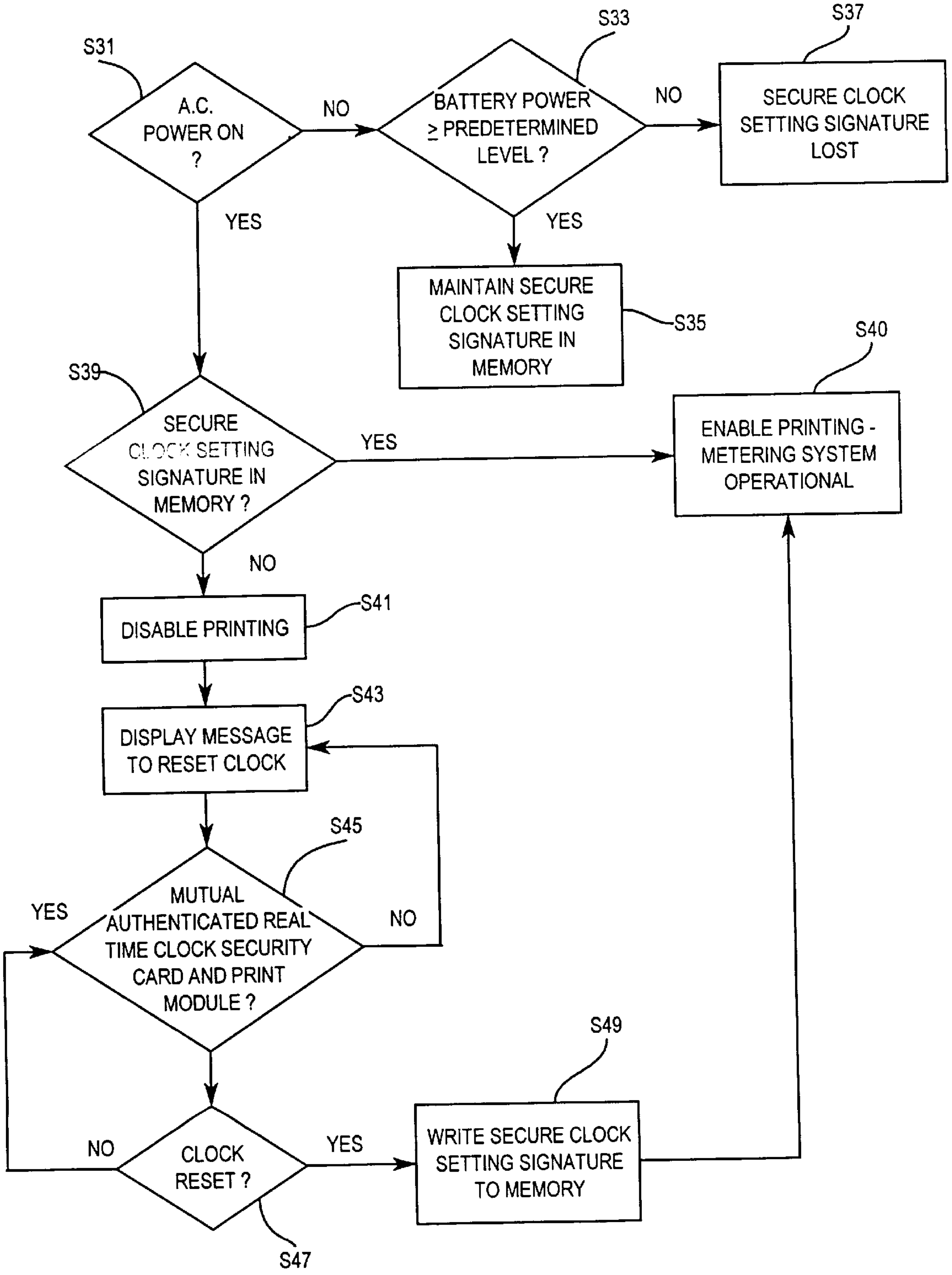
FIG. 3 is a flow chart of the inventive automatic real time clock reset routine associated with the loss of real time clock backup power.

While the above program description of FIG. 2 provides the mechanism for restricting the resetting of a real time clock in an electronic postage metering system 2 to only those users possessing an authenticated real time clock security card 98, FIG. 3 is directed toward the programming incorporated in memory 100 which ensures that the real time clock registers 90 are automatically required to be reset in the event that the batteries 46 fail to provide the required back-up power for the real time clock of microprocessor 26 when the AC power is removed from the electronic metering system 2. With reference to FIG. 3, at step S31, a determination is made as to whether the AC power is on. If the AC power is not on the back-up battery 46 together with the battery back-up circuit 48 provide the required power to microprocessor 26 to ensure continued operation of the real time clock mechanism. Thus, at step 33, as long as the power being provided by the battery 46/battery back-up circuit 48 to microprocessor 26 remains greater than or equal to a predetermined level, a signature which has been written into a volatile memory 102 of microprocessor 26 is retained in memory 102. This signature is indicative that the real time clock has previously been set in a secure manner utilizing an authenticated real time clock security card 98 in the manner described in FIG. 2. However, in the event that the batteries fail to provide the required voltage level to microprocessor 26, the necessary power to maintain the signature in volatile memory 102 is not present such that the signature is lost.

Returning to step S31, once the electronic metering system 2 is powered up with AC power, the programming in memory 100 automatically goes through an initialization routine where at step S39 the microprocessor 26 checks to see if the secure clock setting signature is written into volatile memory 102. If the signature is present, printing is enabled and the meter is in its operational state and ready to perform a postage transaction (step S40). Alternatively, if the signature is not written in memory 102, which would indicate the loss of the required battery back up power, printing by the electronic metering system 2 is disabled as shown in step S41. In step S43 a message is displayed on display 64 advising the user that the real time clock must be reset. At this point in time, the only way the real time clock can be reset is by inserting a real time clock security card 98 into the connector 70 which card is then verified as an authenticated real time clock security card in accordance with the programming flow of FIG. 2. Thus, at step S45 an inquiry is made by microprocessor 26 to determine whether there has been a mutual authentication of a real time clock security card 98 and the print module 4. If the answer is "NO", this means that the flag at step S17 of FIG. 2 has not been set in which case printing remains disabled and the display 64 continues to request the user to reset the clock. Moreover, in the event that an external smart card accounting module 10 has been inserted in lieu of a real time clock security card 98, the electronic metering system 2 will recognize the external smart card accounting module and will designate it to be utilized for accounting purposes as discussed in connection with steps S7 and S9 of FIG. 2. However, until the real time clock has been reset, no accounting and printing can take place. In the event, at step S45, the mutual authentication has properly taken place, the user is free to reset the real time clock (step S47). Until the user does so, however, the display will continue to display the message requiring the user to reset the clock. Once however the user resets the clock utilizing the set up procedures stored in memory 94, the microprocessor 26 then writes the secure clock setting signature to the memory 102 (step S49) and subsequently enables printing and operation of the electronic metering system 2 (step S40).

It is readily apparent that the programming set forth in memory 100 requires the electronic metering system 2 to have its real time clock reset whenever there is a failure of the battery back up system 46/48. That is, each time the AC power is turned on an initialization routine checks to see if the secure clock signature is in memory 102. If it is, the electronic postage metering system 2 is enabled. However, if the secure clock setting signature is not present in memory 102 the resetting of the real time clock is required and this resetting can only be accomplished by a user possessing the necessary real time clock security card 98. This routine therefore accomplishes two things: 1) it ensures that only the user possessing the real time clock security card 98 can reset the postage meter and 2) it ensures that the real time clock is set whenever the back up battery power is lost. If such was not the case, the meter would operate under the AC power even though the back up battery power had failed and therefore the registers 90 would have the wrong time since the time period during which the meter did not have AC power applied thereto and during which the batteries failed would not be accounted for in the registers 90.

In view of the above, it is very clear that the instant invention provides a real time clock security mechanism which can be retrofitted into existing postage metering systems in an easy manner and for a minimum cost. That is, only software needs to be downloaded into the microprocessor 26 to perform the functions identified in FIGS. 2 and 3 and no hardware needs to be added. Thus, the cost associated with sending out a serviceman to incorporate hardware changes (or having the unit shipped back to the factory or service center) is precluded and the software changes can be downloaded without a service call via the modem 30 or via a special smart card which can be inserted into the connector 70.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims. For example, while the preferred embodiment describes an external smart card, it could also be a card with a magnetic stripe or any equivalent type of structure.

What is claimed is:

1. A method for requiring resetting of a real time clock in a postage metering system, the method comprising the steps of:

A) operating the postage metering system under a primary power source;

B) disconnecting the primary power source from the postage metering system;

C) at times when the primary power source has been disconnected from the postage metering system, providing backup power to the postage metering system via a backup power source enabling continued operation of the real time clock;

D) at times when the backup power source fails and upon subsequent reconnection of the primary power source to the postage metering system, disabling the postage metering system from operating;

E) requiring resetting of the real time clock as a prerequisite to reenabling operation of the postage metering system subsequent to its disablement in step D);

F) requiring inserting a real time clock security card into the postage metering system as a necessary condition to enable a user to reset the real time clock; and G) subsequent to inserting the real time clock security card into the postage metering system, resetting the real time clock thereby enabling operation of the postage metering system.

2. A method as recited in claim 1, wherein the postage metering system includes a microprocessor having a memory and further comprising the steps of initially setting the real time clock;

subsequent to initially setting real time clock, writing a signature to the memory which signature is indicative that the real time clock has been set;

subsequent to step B), maintaining the signature in memory utilizing the backup power source;

losing the signature from the memory at times when the backup power source fails;

upon reconnection of the primary power source to the postage metering system, utilizing the microprocessor for checking if the memory has the signature resident therein;

in the event that the microprocessor determines that the memory does not have the signature resident therein, disabling operation of the postage metering system and requiring the resetting of the real time clock as a prerequisite to reenabling operation of the postage metering system;

subsequent to performing steps F) and G), writing the signature to the memory.

3. A method as recited in claim 2 wherein the real time clock security card is a smart card.

4. A value dispensing system comprising:

a printing mechanism for printing an indication of value;

a microprocessor including a real time clock mechanism, the microprocessor initiating printing of the indication of value by the printing mechanism;

means for electrically connecting the value dispensing system to a primary power source and for utilizing power received from the primary power source to operate the microprocessor and the printing mechanism;

a back-up power source which supplies backup power to the microprocessor to enable continued operation of the real time clock only when the value dispensing system has been disconnected from the primary power source;

wherein the microprocessor is programmed to 1) disable operation of the printing mechanism upon a failure of the backup power source and in response to reconnection of the primary power source to the value dispensing system, 2) require resetting of the real time clock as a prerequisite for reenabling the operation of the printing mechanism subsequent to its disablement by the microprocessor, and 3) only permitting the resetting of the real time clock subsequent to inserting a real time clock security card into the value dispensing system.

5. A value dispensing system as recited in claim 3, wherein the microprocessor includes a memory having a signature stored therein which is indicative that the real time clock has been initially set, and each time the value dispensing system is reconnected to the primary power source the microprocessor determines if the signature has been maintained in the memory by the backup power source and if the signature is not present in the memory the microprocessor disables operation of the printing mechanism.

6. A value dispensing system as recited in claim 5, wherein the real time clock security card is a smart card.

* * * * *